United States Patent [19]

Wiley

[11] 3,908,084

[45] Sept. 23, 1975

[54] HIGH FREQUENCY CHARACTER RECEIVER

[75] Inventor: Paul Ronald Wiley, Naperville, Ill.

[73] Assignee: Bell Telephone Laboratories, Incorporated, Murray Hill, N.J.

[22] Filed: Oct. 7, 1974

[21] Appl. No.: 513,035

[52] U.S. Cl. .. 178/69.5 R; 179/15 AQ; 179/15 AT; 340/172.5

[51] Int. Cl.[2] .......... H04J 3/00

[58] Field of Search ....... 179/15 BS, 15 AQ, 15 AT; 325/58; 178/69.5 R; 340/172.5

[56] References Cited

UNITED STATES PATENTS

| | | | |
|---|---|---|---|
| 2,744,960 | 5/1956 | Greefkes et al. | 179/15 |
| 3,309,463 | 3/1967 | Roedl | 178/69.5 |
| 3,389,381 | 6/1968 | Foster | 340/172.5 |
| 3,438,004 | 4/1969 | Laviron | 340/172.5 |
| 3,472,956 | 10/1969 | Glasson | 178/69.5 |
| 3,543,243 | 11/1970 | Nordquist | 340/172.5 |
| 3,648,248 | 3/1972 | Deman et al. | 340/172.5 |
| 3,649,763 | 3/1972 | Thompson | 179/15 AQ |
| 3,699,261 | 10/1972 | Tomozawa | 179/15 |
| 3,736,381 | 5/1973 | Johnson et al. | 179/15 AT |
| 3,806,657 | 4/1974 | Chow | 179/15 AQ |

*Primary Examiner*—Charles E. Atkinson
*Assistant Examiner*—Errol A. Krass
*Attorney, Agent, or Firm*—F. W. Padden

[57] ABSTRACT

A receiver is disclosed for synchronized character pulse processing in a time slot interchange system. The receiver analyzes the phase of a character start pulse for synchronizing succeeding pulses of the character with out-of-phase clock signals of the same frequency. A delay line is included in the receiver for generating a plurality of partially coincident output signals on plural phase delay line ports and in response to received character pulses on an input data channel. A plurality of receiver subcircuits monitor each of the delay line output ports and each comprises a plurality of storage elements which are operated by clock signals and outputs at the monitored ports for maintaining a prescribed number of most recent port state samples. Logic circuitry is responsive to prescribed states of the storage elements for detecting the arrival of a start pulse and for selecting for synchronization a preferred one of the subcircuits from which approximate midpoint samples of the start pulse and succeeding character pulses are obtained for processing through a shift register to utilization circuitry.

15 Claims, 6 Drawing Figures

HIGH FREQUENCY CHARACTER RECEIVER

BACKGROUND OF THE INVENTION

My invention relates to data receivers and particularly to circuitry useful with such receivers for synchronizing the phase of incoming character pulses with clock signals of the same frequency.

It has been a widespread practice in low and moderate speed telegraph and like systems to employ asynchronous, or nonclocked, transmission of binary-encoded characters and to utilize a start code e.g., the familiar mark and space code, prceding each character for effecting character synchronization of a receiver. In many such systems, the data rates are sufficiently low enough to allow for nonclocked reception and processing of the character pulses. Typically, these asynchronous receivers operate by sensing leading edge transitions of character pulses and by thereafter delaying one-half of a pulse interval before sampling each pulse. In this manner, midpoint pulse sampling is conveniently achieved.

At higher rates of data transmission, asynchronous receiver operation is often not adequate for reliable pulse reception. Thus, it has become a common practice to provide synchronous receivers, i.e., clocked receivers, for high frequency fidelity.

The successful operation of synchronous data communication requires a phase alignment, or synchronization, of receiver clock signals with that of arriving pulses. Synchronization is needed for enabling clock signals to coincide approximately with arriving pulse centers or, conversely, for controlling the phase of pulses to coincide with that of clock signals.

It has proved to be a problem to achieve such synchronization in systems operating in frequencies approaching ilustratively 16 MHz or greater as well as in systems in which pulse transmission and reception are controlled by a common clock source. The problem generally is a result of pulse propagation delay which, ever over short distances, is undesirably significant in causing phase misalignment at a receiver. I have found that the problem arises, for example, in a time division mutiplex telephone exchange network in which the propagation delay varies with each selectable path through the network and undesirably precludes simple, static methods of compensating for the delay.

Numerous prior art techniques exist for providing phase synchronization between character pulses and clock signals, one of which employs circuitry cooperating with a synchronization frame of pulses which is transmitted immediately prior to each character transmission and which is utilized for controlling the phase of a receiver oscillator. The oscillator, in turn, generates clock signals which coincide in phase with succeeding pulses of the character. Unfortunately, such oscillator techniques have proved to be costly and difficult to control. Moreover, synchronization codes are often lengthy and wasteful of transmission media capacity..

In view of the foregoing, it is apparent that a need exists for a less expensive and simpler synchronizing arrangement which improves transmission capacity.

SUMMARY OF THE INVENTION

The foregoing need is fulfilled in accordance with an illustrative embodiment of my invention in which circuitry is provided for achieving phase synchronization between clock signals and character pulses of the same frequency by varying the phase of the pulses by discrete quantizations to sync with fixed frequency clock pulses and advantageously, without a need for a synchronizing frame of pulses. The circuitry comprises means responsive to an arrival of a character pulse for consecutively generating on a plurality of output ports partially coincident output signals of prescribed duration. Advantageously, the generation of successive ones of the signals is delayed by a prescribed time interval less than the prescribed duration of the signals. The circuitry includes facilities for selecting an appropriate one of the input ports for synchronization illustratively on a single start pulse of a received character and thereafter for synchronously sampling succeeding pulses of the character with reference to the selected port.

In a specific illustrative embodiment, the receiver comprises a delay line having an input port connected to a data channel and a plurality of output ports. The delay line is responsive to an arrival of a character pulse on the data channel for generating a plurality of signals partially coincident in time on successive ones of the output ports. The arrangement insures that a portion of each signal is present at a majority of the output ports upon the occurrence of at least one clock signal. Each port is monitored by an individual receiver subcircuit which operates to examine states of each port simultaneously upon the occurrence of clock signals. The examination results are stored in individual subcircuit storage elements provided for continuously maintaining a prescribed number of most recent examinatins, or samples. Consecutive ones of these samples represent prior states of the data channel at equal subintervals of a clock interval and span a prescribed number of clock intervals.

Arrival of a character start pulse is signified by a transition on the data channel from a steady-state logical zero condition to a logical one pulse and the transition thereafter appears in consecutive ones of the subcircuit storage elements as a sequence of logical zeros followed by logical ones. The specific adjacent ones of the elements at which the transition appears are dependent upon the phase relationship between the start pulse and receiver clock signals. Advantageously such an arrangement allows both for detecting the arrival of the start pulse and for ascertaining a preferred one of the subcircuits containing in its storage element an approximate midpoint sample of one of the delay line output port signals.

Logic circuitry is provided and made responsive to an occurrence of the above sequence in prescribed ones of the storage elements for selecting the preferred subcircuit. Thereafter, steering circuitry enabled by the selecting circuitry is effective for establishing a communication path between the preferred subcircuit monitoring a preferred delay line port and including subcircuit storage elements for steering samples of succeeding character pulse signals from the preferred subcircuit to a shift register.

A number of advantages accrue from use of the above-described exemplary receiver structure aside from the ease and simplicity with which phase synchronization is obtained. Advantageously, the receiver effectively partitions each clock interval into a plurality of subintervals during which multiple samples are obtained per clock interval and without the need of a separate higher frequency clock. By using the multiple samples, the receiver is tolerant of severe pulse distortion at leading and lagging edges of pulses, such as for example, pulse stretching and shrinking caused by logic elements.

Furthermore, the fact that a lower frequency clock source may be used than would otherwise be required to obtain the multiple samples allows the use of lower speed logic elements and their attendant cost advantages and greater noise insensitivity. Importantly, my invention further results in full clock intervals after receiver operations and during which logic circuits may stabilize rather than the shorter intervals which would result from use of a higher frequency clock source. This latter feature becomes increasingly important at higher frequencies of operations and often is a limiting one.

It is a feature of my invention that a data receiver is equipped with a delay line having a plurality of outputs for providing multiphase, or delayed, start pulses for a data character. The outputs are operationally connected to a selection circuit which compares the multiphase start signals with clock pulses to ascertain when a clock pulse occurs at an approximate midpoint in the duration of the character start pulse. The selection circuit comprises a plurality of subcircuits having bistable flip-flops for storing samples of the multiphase signals appearing at the delay line outputs upon the coincident occurrence of a clock pulse. Each of the subcircuits comprises logic gates for steering the signal samples to the flip-flops. The subcircuits advantageously comprise decoding gates which are responsive to a coded plurality of stored signals from the flip-flops for selecting any one of said output ports for synchronized operation with the clock pulses in the transmission of the start and data character pulses from the delay line outputs to a shift register and ultimately to a utilization circuit.

DRAWING DESCRIPTION

A more detailed understanding of my invention will be apparent from the following detailed description of an exemplary embodiment thereof, when read in conjunction with the accompanying drawing, in which.

Figure 3:
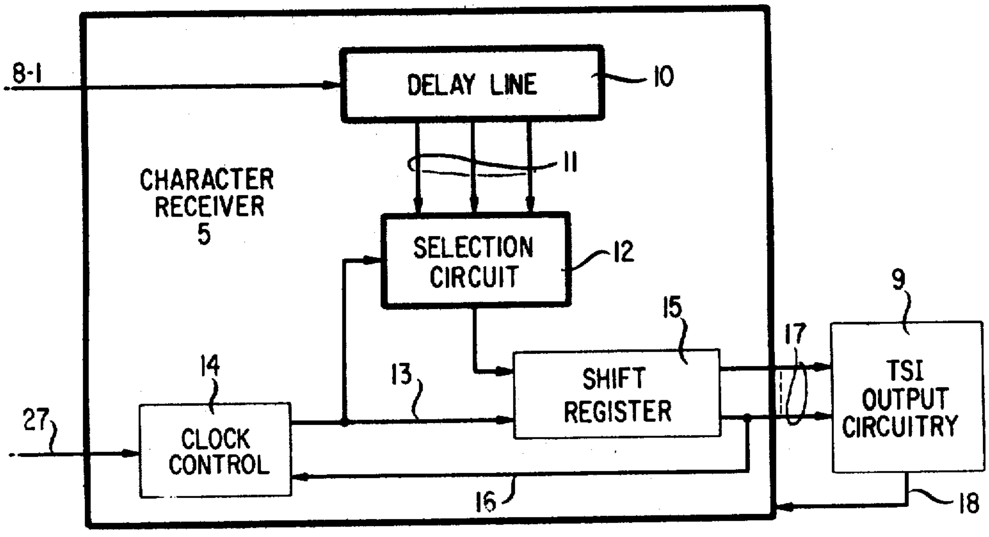
Figure 4:
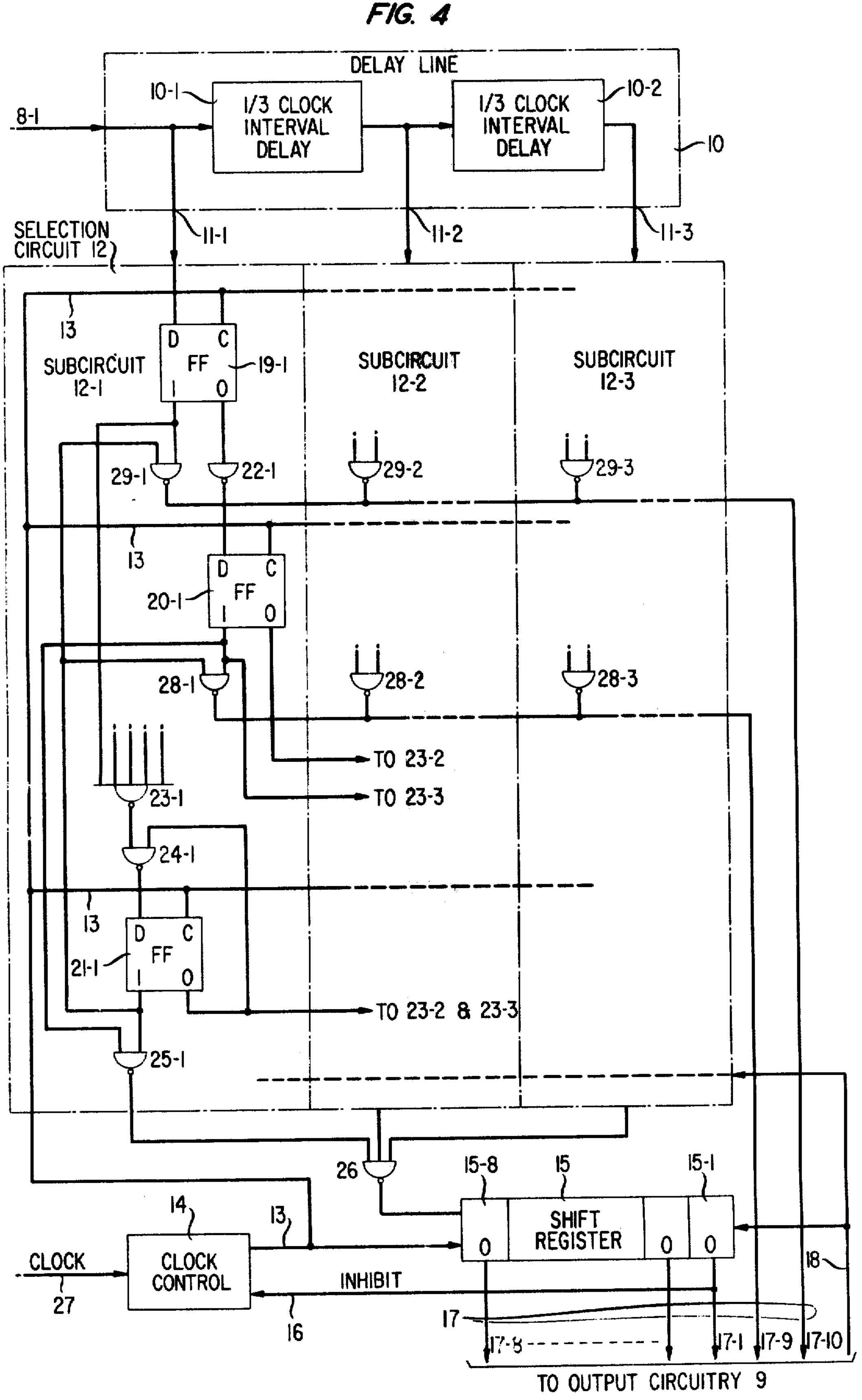
Figure 5:
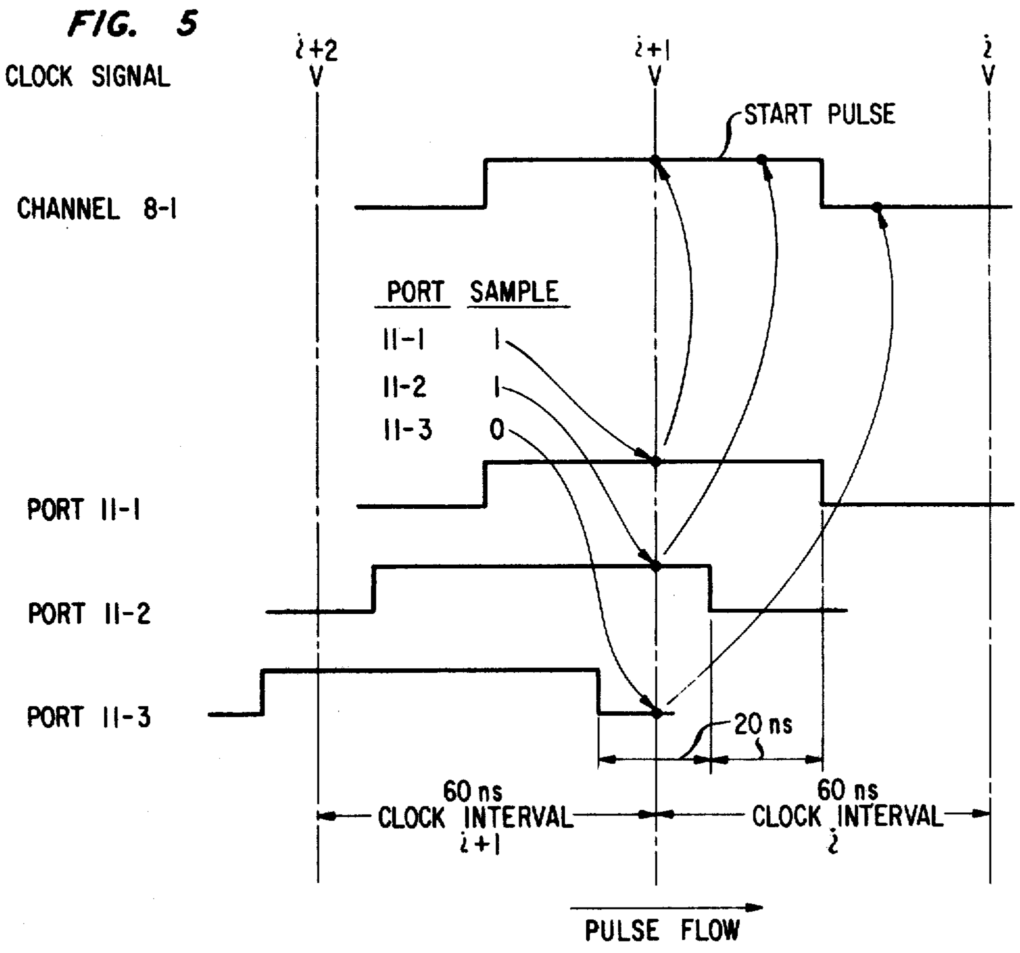
Figure 6:
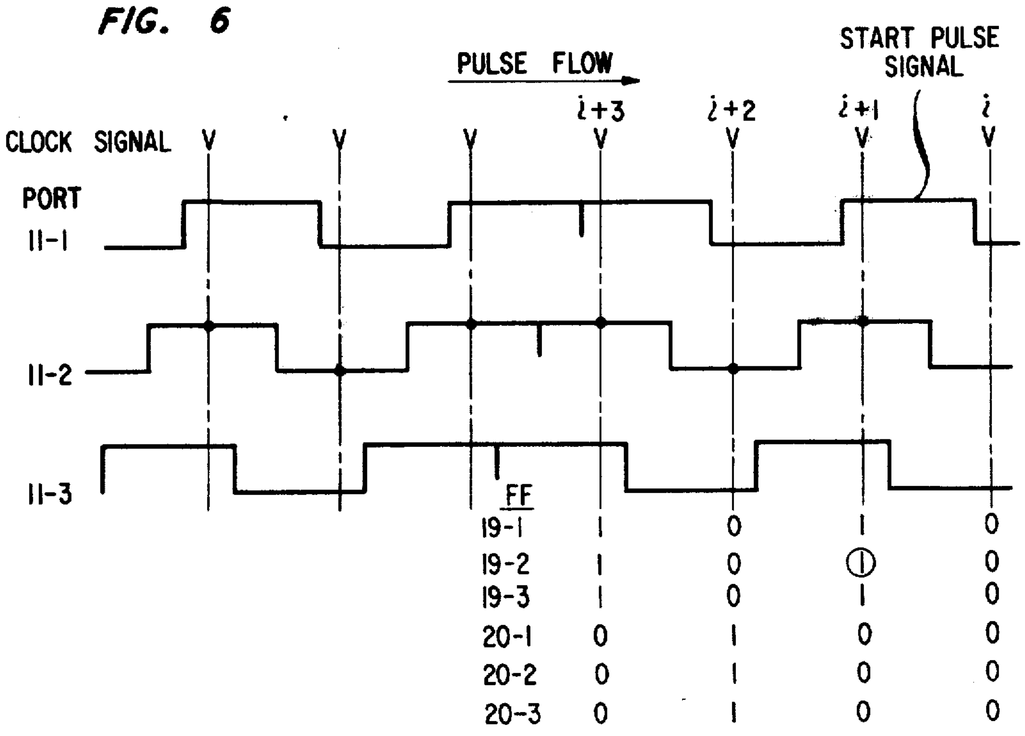

FIG. 3 blockwise illustrates the synchronizing control circuitry of an exemplary character receiver according to my invention;

FIG. 4 is a detailed circuit schematic of the exemplary embodiment of the invention; and FIGS. 5 and 6 contain a series of character pulse waveforms useful for understanding the operation of the circuit of FIG. 4.

DETAILED DESCRIPTION

Figure 1:
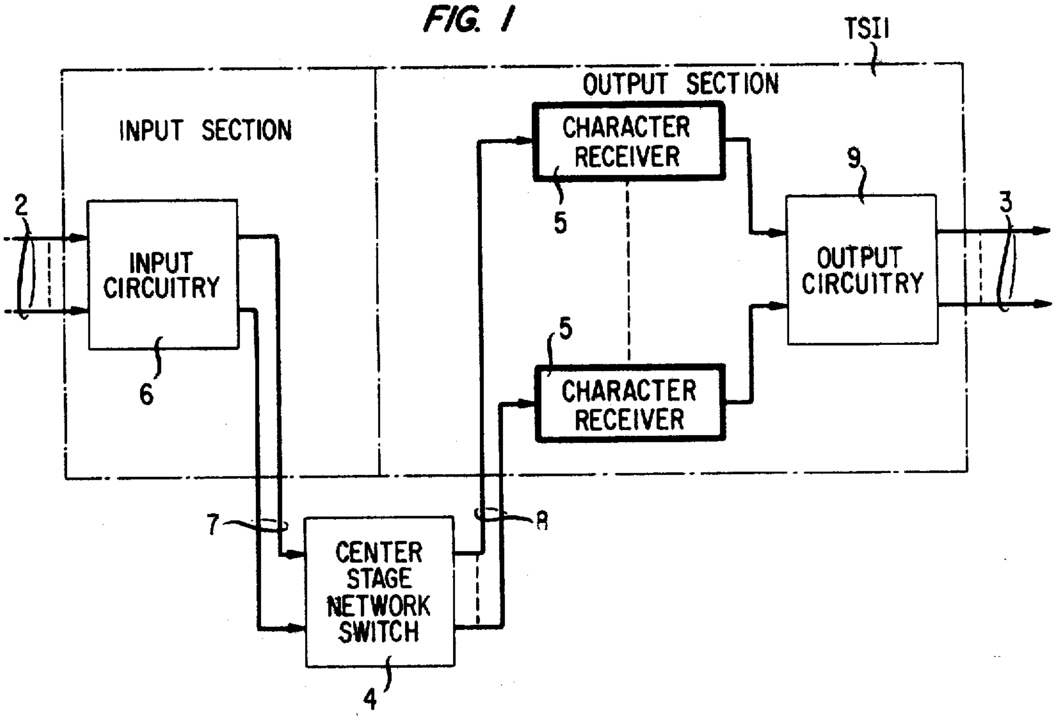
FIG. 1 is a block diagram of the specific illustrative embodiment of my invention as utilized in a time slot interchange network of a telephone system.

In FIG. 1 a time division network for a telephone exchange is shown comprising a time slot interchange TSI1 intermediate a plurality of incoming and outgoing trunks 2 and 3 and having connections to a center stage network switch 4 via respective input and output circuitry 6 and 9. The network operates essentially as the network described in G. D. Johnson et al. in U.S. Pat. No. 3,736,381, of May 29, 1973. My invention is concerned with a plurality of character receivers 5 in an output section of TSI1. Receivers 5 operate for receiving call processing characters distributed by the input circuitry 6 to ports of switch 4 and destined for desired ones of outgoing trunks 3.

A complete understanding of the operation of the network is not essential for an understanding or practice of my invention and, accordingly, the network is not described in detail herein. Reference may be made to the Johnson et al. patent for a complete disclosure of the network structure and operations. Briefly, incoming data arrives at an input section of TSI1 on trunks 2 in the form of streams of pulse code modulated information, each of which comprises a plurality of multiplexed time slots containing therein 8-bit characters of speech information. Input circuitry 6 buffers one character from each one of trunks 2 and concurrently, distributes priorly buffered characters to desired ports of switch 4 as a burst of serial pulses on ones of channel 7. The internal switching paths of switch 4 are reconfigured each time slot in an appropriate manner for distributing the characters over channels 8 for transmittal to desired ones of outgoing trunks 3 via receivers 5 and output circuitry 9. Receivers 5 operate for receiving the character pulses enroute, converting them to a parallel format, and for thereafter transferring the characters to output circuitry 9 for distribution to trunks 3.

Figure 2:
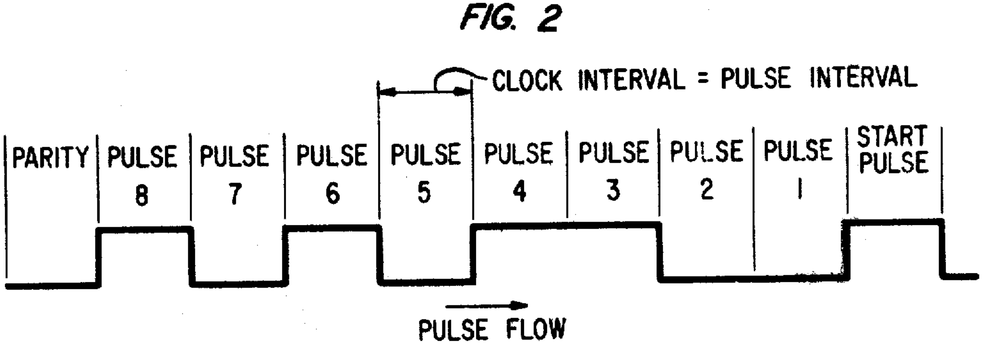
FIG. 2 is an exemplary character format.

Ordinarily, receivers 5 do not receive characters in every time slot due to the fact that the network is rarely fully occupied with telephone traffic. In order to alert the receivers of a character transmission, TSI1 input circuitry 6 appends a start pulse to each character before distribution to switch 4. A parity pulse is also added at this time to form a character of 10 pulses, an illustrative one of which is shown in FIG. 2. Character pulses, as shown in FIG. 2, are illustratively of a non-return-to-zero (NRX) format. That is, pulses of a high, or "1", state maintain that state for an entire duration of a clock interval, only returning to a low, or "0", state when 0 pulses are transmitted or upon termination of transmittal of a character. Adjacent 1 pulses 3 and 4 in FIG. 2 illustrate this characteristic. Such a character and pulse format is used herein for explaining the operation of an exemplary embodiment of my invention. However, it should be understood that my invention is not limited to any such format.

An exemplary embodiment of receiver 5 is blockwise illustrated in FIG. 3. In that figure, incoming pulses arrive at receiver 5 on data channel 8-1, which is an individual one of channels 8 in FIG. 1, illustratively at frequency of 16 MHz. Clock signals appear on lead 27 also at a frequency of 16 MHz, but of arbitrary phase with respect to the arriving pulses, and are passed by clock control 14 directly to lead 13 for controlling operations of receiver 5. The arriving pulses are routed into an input port of delay line 10. Thereafter, signals of a prescribed duration appear on consecutive ones of output ports 11 after a predetermined time delay between each appearance less than the duration of each signal. Regardless of the phase difference between incoming pulses and clock signals, one of ports 11, a preferred one, contains thereon signals which are approximately centered, as a result of the consecutively delayed signals, with clock signals to within a margin illustratively approaching the time delay between consecutive ones of ports 11. Selection circuit 12 in accordance with a feature of my invention, comprises subscricuits (not shown in FIG. 3 but depicted in FIG. 4) for coincidently utilizing both the clock signals from the clock control 14 and multiphase signals on individual ones of the ports 11 for ascertaining an appropriate character start pulse phase for character pulse-clock signal sync. Circuit 12 includes circuitry for both detecting an arrival of a character start pulse and for selecting the appropriate delayed phase of the received start pulse among those at the multiple ports 11. It does so by a coincident comparison of the clock signal with the delayed signals at outputs 11. Thereafter, synchronized samples of the start pulse and succeeding character pulses are obtained from the selected one of the ports 11. Based on the synchronizing, all character pulses are extracted from a subcircuit within circuit 12 which is associated with the selected port 11. Next, the extracted pulses are inserted into a shift register 15 under control of clock signals from clock control 14.

This process continues until the complete character has been shifted in register 15 as evidenced by an appearance of a start pulse sample in a final stage of register 15. Its presence in this stage causes an inhibit signal to be returned to clock control 14 via lead 16. Resultingly, clock signals on lead 13 cease causing a cessation of receiver 5 operation. The inhibit signal on lead 16 is also applied to one of leads 17 for notifying output circuitry 9 of the availability of the character for parallel readout of register 15. Shortly thereafter, output circuitry 9 accepts the character via leads 17 and responds with a reset signal on lead 18. This signal is effective for placing receiver 8 in an initial state from which it resumes scanning operations for detecting the arrival of another character start pulse.

Turning now to FIG. 4, there is seen a detailed circuit embodiment of the illustrative receiver of FIG. 3. Delay line 10, at the top of FIG. 4, is shown with output ports 11-1, 11-2, and 11-3 interconnecting the delay line to individual subcircuits 12-1, 12-2, and 12-3 of selection circuit 12. Each subcircuit, in turn, has connections to an input terminal of shift register 15 for sequentially shifting signal samples therein from a selected one of subcircuits 12-1 to 12-3 as will be described.

Delay line 10 comprises individual delay elements 10-1 and 10-2 arranged serially and each of which operates for providing continuous delay between states at their input and output terminals of one-third of a clock interval, or 20 ns, in this illustrative embodiment. Output ports 11-1, 11-2, and 11-3 are internally connected to input (nondelayed), midpoint (delayed), and output (fully delayed) terminals in the series arrangement as shown in FIG. 4. As a result of this arrangement, character pulses of one clock interval, or 60 ns, duration appearing on data channel 8-1 also consecutively appear thereafter on output ports 11-1 to 11-3 as signals of 60 ns duration, successive ones of which are delayed with respect to a preceding signal by 20 ns.

To illustrate the latter features, consider the arrival of a character start pulse on data channel 8-1 together with an occurrence of clock signals $i$ $i$+1 and $i$+2, such as shown at the top of FIG. 5. Pulse flow is towards the right of the figure, with time progression towards the left. The leading edge of the start pulse is the rightmost edge of the pulse. As a result of delay elements 10-1 and 10-2 of FIG. 4 and connections of output ports 11-1 to 11-3 thereto, each consecutive one of the resulting signals on the ports are delayed one-third of a clock interval as shown by the port signal waveforms in the lower portion of FIG. 5. Delay elements useful for generating such waveforms are conventional. For example, elements 10-1 and 10-2 may be implemented by a delay element such as described in Electronic Engineers Master, 1974/75 Catalog, Vol. 3, at page 762.

It is apparent from FIG. 5 that samples taken of the states of output ports 11-1 to 11-3 upon the occurrence of clock signal $i$+1 effectively represent samples of the state of data channel 8-1 at subintervals during the previous clock interval. This relationship is illustrated by arrows in FIG. 5 relating the port samples to channel 8-1 states during clock interval $i$. In this example, the states existing on ports 11-3 to 11-1 at the time of clock signal $i$+1 correspond to 0, 1, 1. The second 1 occurring in this sequence defines a preferred port whose signal is approximately centered with respect to clock signals for providing synchronization with pulses following this specific start pulse in FIG. 5, here port 11-1. Selection circuit 12 uses sequences such as this one taken during two preceding clock intervals for detecting a start pulse and ascertaining the preferred synchronizing port as will be described in the following discussion.

The structural details of subcircuits 12-2 and 12-3 are not shown in FIG. 4, it being understood that these subcircuits are essentially identical in structure and operation to subcircuit 12-1 except for minor differences which are specifically described below when appropriate. For purposes of this discussion, the circuit elements of a subcircuit are designated by unique numbers followed by a hyphen and another number identifying the particular subcircuit in which the element in question appears. For example, element 19-1 in subcircuit 12-1 would correspond to element 19-2 in subcircuit 12-2.

Subcircuit 12-1 comprises, as shown, logic elements such as NAND gates and delay type D flip-flops. Specifically, flip-flops 19-1 and 20-1 serve for storing the two most recent consecutive state samples of output port 11-1. Similarly, flip-flops 19-2, 19-3 and 20-2, 20-3 in the remaining subcircuits serve for storing the last most recent two consecutive samples of ports 11-2 and 11-3. Flip-flop 21-1 in subcircuit 12-1 and flip-flops 21-2 and 21-3 in the remaining subcircuits are individually operated upon detection of a start pulse in a manner described below for selecting one of subcircuits 12-1 to 12-3 from which midrange samples of port signals are extracted and inserted into shift register 15.

During the idle state of the circuits in FIG. 4, all flip-flops are reset in the various subcircuits 12-1 through 12-3. The output ports 11-1 through 11-3 rest in a 0 state and a 0 signal is imputted on channel 8-1. In addition, the shift register 15 is reset to apply 0 data to the output circuitry 9. Upon the arrival of a character start pulse, channel 8-1 has a transition from a 0 to a 1 and causes that signal to appear on output leads 11-1 through 11-3 of the delay line 10 with respective zero delay, 20 nanoseconds delay, and 40 nanoseconds delay. In order to determine the appropriate one of the signals on leads 11-1 through 11-3 which is to be used for synchronization, it is necessary for these signals to be correlated with clock pulse signals from the clock control 14. The correlation is achieved by applying the clock pulse signals and the delayed start pulse signals to the subcircuits 12-1 through 12-3 of the selection circuit 12. The clock and start pulses are examined in each of the subcircuits to ascertain when a clock pulse signal occurs illustratively at approximately the midpoint in the duration of a character start pulse. Initially, the start pulses on leads 11-1 through 11-3 are stored in flip-flops 19-1 through 19-3 under control of clock pulses on lead 13. The stored phases of start pulses are processed through logic gates 22-1 through 22-3 for storage in another set of flip-flops 20-1 through 20-3. The latter flip-flops store logic data resultant from a clock signal-start pulse logic comparison for the immediately preceding clock pulse that were priorly stored in flip-flops 19-1 through 19-3.

It is an advantage of our illustrative embodiment that decoding gates 23-1 through 23-3 are functionally cooperative with the outputs of a coded plurality of predetermined flip-flops 19-1 through 19-3 and 20-1 through 20-3 in each of the subcircuits 12-1, 12-2, 12-3 in order to recognize the desired synchronized relationship between the clock pulse signals and the multiphase signals at the outputs 11-1 through 11-3 of delay line 10. The appropriate determination of the desired sync is manifested by coincident signal conditions from strategic points of the various ones of the flip-flops during concurrent reception of clock pulses. Illustratively, these flip-flop conditions are fundamentally controlled by transitional 1 of the encoded combinations of the flip-flops 19-1 through 19-3 and 20-1 through 20-3. These coded combinations are supplied to respective ones of decoding gates 23-1 through 23-3 for partially enabling the setting of the selecting flip-flops 21-1 though 21-3 which are fully enabled upon a receipt of the next succeeding clock signal on lead 13. Upon the occurrence of the latter clock signal, the appropriate one of the latter flip-flops as defined by the coincident signal conditions from flip-flops 19-1 though 19-3 and 20-1 through 20-3 fixes the synchronization of the character receiver on the associated one of the delay line outputs 11-1 through 11-3 for the present character start pulse and all succeeding pulses of the same character. Moreover, the activated select flip-flop controls the processing of the synchronized character pulses by establishing a communication path from the input channel 8-1 to the shift register 15 stages via the selected one of the subcircuits 12-1 through 12-3.

The foregoing process of entering character pulses into the shift register is effected until the aforementioned character start pulse is fully shifted into stage 15-1 of shift register 15. Thereupon, further processing of signals from channel 8-1 to the shift register is inhibited by control signals on the inhibit lead 16. Concurrently, the shift register interfaces with the output circuitry 9 via leads 17 to provide for the appropriate parallel transfer of the character from shift register 15 and selected ones of the flip-flops 19-1 through 19-3 and 20-1 through 20-3, as hereinafter described.

The above synchronizing operations of the illustrative receiver in FIG. 4 are detailed as follows with particular reference to the operations of subcircuit 21-1 and the start pulse of FIG. 5. The state of output port 11-1 is cntinually applied to the D input of flip-flops 19-1. The appearance of each clock signal on the C input of this flip-flop causes the flip-flop to store a sample of the current state of port 11-1. Thus, in FIG. 5, the low state of port 11-1 at the time of clock signal i before the arrival of the start pulse causes a 0 to be stored in flip-flop 19-1. The complement of this stored sample is obtained from the 0 output of flip-flop 19-1, inverted by gate 22-1, and the inverted state continually applied to the D input of flip-flop 20-1. Upon the occurrence of clock signal $i$+1, the then current high state of port 11-1 which reflects the arriving start pulse is gated into flip-flop 19-1 and simultaneously, the clock signal appearing at the C input of flip-flop 20-1 causes the last sample then stored in flip-flop 19-1 to be transferred to flip-flop 20-1. In a similar manner, subcircuits 12-2 and 12-3 operate simultaneously upon the occurrence of each clock signal $i$ and $i$+1 for maintaining therein the two most recent samples of ports 11-2 and 11-3. A convenient way of viewing this operation is to consider that flip-flops 20-3 through 20-1 and 19-3 through 19-1, inclusive in that order, operate for continually maintaining state samples of data channel 8-1 and which samples span the previous two clock intervals $i$ and $i$+1 at subintervals of 20 ns. Consequently, the arriving start pulse in FIG. 5 is reflected in the states of flip-flops 20-3 to 20-1 19-3 to 19-1 after clock signal $i$+1 as a sequence of 0 s followed by at least two consecutive 1 s in flip-flops 19-2 and 19-1 and which represent start pulse port signals from two adjacent output ports 11-2 through 11-1 of delay line 10. The second 1 sample in the consecutive sequence from port 11-1 necessarily corresponds to the midrange of the incoming start pulse since it corresponds by virtue of the delay in delay line 10 to a sample delayed by 20 ns to 40 ns after the initial sample of the start pulse which is stored in flip-flop 19-2.

Decoding gate 23-1 is arranged to be responsive to the sequence 0, 1, 1 occurring in flip-flops 19-3 to 19-1 and which define subcircuit 21-1 as preferred for synchronization. Specifically, decoding gate 23-1 has three leftmost inputs connected idividually to the 1 output of flip-flop 19-1, the 1 output of flip-flop 19-2, and the 0 output of flip-flop 19-3 for detecting the above sequence. For simplicity, the cross-connections from decoding gate 23-1 to those above flip-flops in subcircuits 12-2 and 12-3 are not shown. The remaining two rightmost inputs of decoding gate 23-1 are individually connected to 0 outputs of selection flip-flops 21-2 and 21-3 and operates as inhibiting inputs for insuring that decoding gate 23-1 does not respond to subsequent pulse samples after a selection of subcircuits 12-2 or 12-3. These cross-connections are also not shown in FIG. 4. As a result of the port samples taken by clock signal *30* in FIG. 5, all inputs of decoding gate 23-1 become "high" and its output, which is connected to the leftmost input of gate 24-1, is forced low. Resultingly, a high is applied to the D input of selection flip-flop 21-1. Thereafter, the next clock signal appearing at the C input of flip-flop 21-1 results in operating the flip-flop to a 1 state because of the high present at its D input. A low is returned from the 0 output of flip-flop 21-1 to the rightmost input of holding gate 24-1 for subsequently maintaining the high to the D input of flip-flop 21-1 after the start pulse signals desappear from flip-flops 19-3 to 19-1.

The foregoing operations result in the operation of selection flip-flop 21-1 for syncing the character pulses with the clock pulses and causes an enabling of a steering gate 25-1 by applying a high to its rightmost input. At this time, the sample representing the start pulse and which was initially stored in flip-flop 19-1 has been shifted into flip-flop 20-1. Thereafter, a sample representing the next character pulse is obtained from port 11-1 and stored in flip-flop 19-1. The resulting high at the 1 output of flip-flop 20-1 is routed to the leftmost input of enabled steering gate 25-1. Gate 25-1 inverts this state and applies a low to the leftmost input of steering gate 26. The remaining two inputs of gate 26 are individually connected to the outputs of steering gates 25-2 and 25-3 in subcircuits 12-2 and 12-3 and are held high by the nonoperated states of selection flip-flops 21-2 and 21-3. Resultingly, steering gate 26 is responsive only to the signal from subcircuit 12-1 appearing at its leftmost input. That signal is inverted by gate 26 and routed to an input of shift register 15. The next occurring clock signal on lead 13, $i+2$, causes the start pulse signal at the output of gate 26 to be inserted into shift register 15. Thereafter and until all pulses of the character have been received, another signal representing a succeeding character pulse is routed from flip-flop 20-1 and enabled gate 25-1 through gate 26 and inserted into register 15 with the occurrence of each clock signal.

Completion of reception of all character pulses is signified by the arrival of the start pulse sample in the final stage 15-1 in shift register 15. Its presence in that stage applies a low signal to inhibit lead 16 extending to clock control 14 and which is effecitve for causing clock control 14 to inhibit the passage of clock signals to lead 13. As a result, all operations of receiver 5 cease. Individual pulse samples of the character are available to output circuitry 9 via signals applied to leads 17. Specifically, the first eight pulses of the 10-bit character are available from 0 outputs of individual stages 15-1 to 15-8 of register 15. The final two pulses of the characters are available from sampling flip-flops 20-1 and 19-1 via gates 28-1 and 29-1 whose outputs are applied via leads 17-9 and 17-10 to the output circuitry 9. Gates 28-1 and 29-1 are enabled by high signals applied to their leftmost inputs by operated selection flip-flop 21-1. Gates 28-2, 28-3, and 29-2, 29-3 in the remaining subcircuits 12-2 and 12-3 are also connected to leads 17-9 and 17-10 in a conventional "collector-and " configuration, but because these gates are disabled by their respective selection flip-flops 21-2 and 21-3, they make no contribution to the states of leads 17-9 and 17-10.

The low signal applied to lead 17-1 and representing the start pulse sample is effective for notifying output circuitry 9 of the availability of the character. Thereafter, output circuitry 9 accepts the character and responds with a signal on lead 18 for resetting receiver 5. The signal is effective for conventionally resetting all flip-flops of the receiver as well as shift register 15. Resultingly, the low inhibit signal on lead 16 disappears, clock control 14 resumes the passage of clock signals and receiver 5 begins scanning operations for the arrival of another character start pulse.

Subcircuits 12-2 and 12-3 operate in a similar manner as described above for subcircuit 12-1. However, their selection as a preferred synchronized subcircuit is effected in the event a start pulse of appropriate phase is received other than the phase of the start pulse in FIG. 5. Specifically, a selection of subcircuit 12-2 occurs when the arriving start pulse is phased with clock signals to produce resultant delay line 10 port signal samples 0, 1, 1in sampling flip-flops 20-1, 19-3 and 19-2. Similarly, a selection of subcircuit 12-3 occurs when the start pulse phase in such to produce the above sampling sequence in flip-flops 20-2, 20-1 and 19-3. Accordingly, decoding gates 23-2 and 23-3 in subcircuits 12-2 and 12-3 are responsive to appropriate outputs of the above flip-flops for detecting the synchronizing sequence. Specifically, decoding gate 23-2 has input connections to the 1 outputs of flip-flops 19-2 and 19-3 and a connection to the 0 output of flip-flop 20-1 for activating the selection flip-flop 21-2 to effect the desired synchronization in a manner similar to that described for subcircuit 12-1. Gate 23-2 also has inhibiting inputs form the 0 outputs of selection flip-flops 21-1 and 21-3 for preventing its undesirable operation when one of subcircuits 12-1 or 12-3 is activated. Similarly, decoding gate 23-3 has input connections to the 1 outputs of flip-flops 19-3 and 20-1, and to the 0 outputs of flip-flops 20-2, 21-1 and 21-2 for sync selection by operating flip-flop 21-3.

Since the operation of subcircuits 12-2 and 12-3, when selected as a result of arrival of a start pulse of appropriate phase, is similar to the operation of subcircuit 12-1 described above, a detailed discussion of their operation is not included herein. However, for completeness, the reader is referred to FIG. 6 wherein is illustrated one sequence of character pulse signals as they appear on output ports 11-1, 11-2, and 11-3 and in such phase relationship to clock signals as results in a selection of subcircuit 12-2. In that figure, note that at the time of occurrence of clock signal $i$, a start pulse signal has not yet arrived. Accordingly, port samples stored in flip-flops 19-1 to 19-3, shown in the column at the lower portion of the FIG., and the prior samples stored in flip-flops 20-1 to 20-3 are 0. By the time of occurrence of clock signal $i+1$, the arriving start pulse has sufficiently progressed through delay line 10 so that signals are present on each one of output ports 11-1 to 11-3. At clock time $i+1$, the updated states of flip-flops 20-3 to 20-1 and 19-3 to 19-1 indicate a 0 to 1 transition between flip-flops 20-1 and 19-3. The flip-flop containing the second 1 in sequence, flip-flop 19-2 here, defines a preferred subcircuit, namely, subcircuit 12-2. Referring to the waveform on port 11-2, it is seen that the signals therein are appropriately centered with the clock signal. Accordingly, decoding gate 23-2 in subcircuit 12-2 is enabled subsequent to the occurrence of clock signal $i+1$ by the sequence 0, 1, 1appearing in flip-flops 20-1, 19-3 and 19-2. Thereafter, selection flip-flop 21-2 is operated by the occurrence of clock signal $i+2$ in similar fashion as earlier described for subcircuit 12-1. Such an operation thereafter results in the routing of pulse samples through flip-flops 19-2, 20-2 and steering gates 25-2 and 26 into shift register 15 as described earlier for subcircuit 12-1 operation.

The reader may, at this time, more fully appreciate the advantages of the exemplary receiver structure described sbove. As seen, my invention is effective for sampling a data channel a plurality of times in each clock interval, while accomplishing the foregoing with clock signals of frequency only equal to that of an incoming pulse stream. Consequently, a full clock interval, rather than a subinterval, is available after occurrence of a clock signal for the stabilization of logic circuits. This increased stabilization time allows for the use of low-speed logic elements with attendant advantages of lower cost and improved noise insensitivity. Alternatively, higher speed logic elements could be employed for achieving reliable pulse reception at even higher frequencies.

Furthermore, the exemplary receiver is tolerant of substantial distortion of the leading and lagging edges of pulses. For example, I have found that individual pulses of a serial stream may have their leading edges prolonged and their lagging edges simultaneously shortened, or vice versa, by as much as 15 ns at the illustrative frequency of 16 MHz before intolerable errors occur.

It is noteworthy that the above advantages may be easily enhanced by increasing the number of delay line output ports and/or by providing a delay line for delaying character pulses a greater interval of time than that disclosed herein. For example, by increasing the number of output ports and by providing for appropriate intervals of delay of pulses therebetween, a narrower pulse midrange may be selected for the synchronizing of pulses. Resultingly, the tolerance to pulse distortion is improved. As another example, the provision of a delay line for delaying pulses longer than one clock interval as disclosed, and cooperating with a number of output ports greater than three allows for synchronizing operations of one frequency by utilizing a lower clock frequency and a desirably corresponding increase in the allowable time for the stabilization of logic circuits.

It is to be understood that the above-described arrangement is merely illustrative of the application of the principles of the invention, and that other arrangements may be devised by those skilled in the art without departing from the spirit and scope of the invention. It is also understood that the invention is not limited to use in a time division telephone exchange network, but may find general application in many data transfer environments.

What is claimed is:

1. For use in a data receiver having a delay line for receiving character start and data pulses and providing at least three output ports each of which supplies a different delay signal sample of said start and data pulses, a source for supplying clock pulse signals, a shift register for receiving start and data pulses serially via said delay line ports and supplying said received pulses in parallel to a utilization means, the improvement comprising selection means including a plurality of subcircuits responsive to a receipt of delay signal samples from said output ports and to supplied clock pulse signals for selecting delayed start and data pulses on any one of said output ports for synchronized operation with said clock pulse signals in the transmission of said start and data pulses from said delay line ports to said shift register.

2. The invention of claim 1 wherein each of the subcircuits comprises bistable elements for storing successive start and data pulses from said output ports, and logic elements responsive to supplied clock pulse signals cooperating with ones of delay signal samples stored in said bistable elements for selecting a synchronized one of said output ports for transmission of said signal samples from said selected port to said shift register.

3. The invention of claim 2 wherein said bistable elements comprise a group of flip-flops for storing a present sample of delay signal samples from said output ports and other flip-flops for storing delay signal samples previously stored in said first mentioned flip-flops and said logic elements comprise a group of selection flip-flops responsive to stored signals in said first mentioned and other flip-flops for selecting any one of said output ports for synchronized operation with said clock pulse signals in the transmission of said start and delay pulses from said delay line ports to said shift register.

4. A receiver operated by clock signals of a prescribed frequency for providing phase-synchronization between said clock signals and character pulses arriving at the same frequency comprising, means having a plurality of output ports and being responsive to an arrival of a pulse on an input port for consecutively generating on said output ports a plurality of partially coincident signals of a prescribed duration and including means for delaying a generation of succesive ones of said signals by a prescribed time interval less than said duration, means actuated by said clock signals for sampling states of each of said output ports, and means responsive to prescribed sequences of samples of said output port states signfiying one of said output ports synchronized with said clock signals for selecting said last-mentioned one of said ports for synchronized character pulse reception.

5. A receiver comprising a source of clock signals and a register for providing phase synchronization between character pulses arriving at a prescribed frequency and clock signals occurring at the same frequency comprising, means having an input port and a plurality of output ports and being responsive to an application of a character pulse on said input port for consecutively generating signals of a prescribed duration on successive ones of said output ports, and wherein said generating means includes means for delaying an appearance of said signals on consecutive ones of said output ports by a prescribed time interval less than said prescribed duration, means connected to ones of said output ports and being actuated by said clock signals for storing most recent samples of said signals, means responsive to prescribed states of said storing means signifying a receipt of a character start pulse for selecting for synchronized character pulse reception a preferred one of said output ports priorly containing thereon one of said signals the duration of which is approximately centered with respect to one of said clock signals, and means enabled by said selecting means for steering samples of succeeding signals obtained from said preferred one of said output ports from said storing means to said register.

6. The invention of claim 5 wherein said delaying means further comprises a delay line having said input port and plural output ports.

7. The invention of claim 5 wherein said storing means comprises a plurality of first storage elements each of which is connected to an individual one of said output ports for storing samples of said signals, and a plurality of second storage elements each of which is connected to an individual one of said first storage elements for storing samples of states of said first storage elements.

8. The invention of claim 7 wherein each of said first and second storage elements comprises a plurality of bistable devices and logic gate means controlled by said clock signals for storing in the respective bistable devices samples of said output ports and said first storage elements.

9. The invention of claim 5 wherein said selecting means comprises decoding means for detecting said prescribed states of said storing means signifying arrival of said start pulse, and means operated by said decoding means for enabling said steering means to establish a communication path between said preferred one of said ports and said register and including said storing means.

10. A receiver for receiving character start and data pulses of a prescribed frequency and including a source of clock signals of said prescribed frequency and a shift register comprising, means having an input port and at least three output ports and being responsive to an application of a character pulse of prescribed duration on said input port for consecutively generating a signal of said prescribed duration on successive ones of said output ports, wherein said generating means includes, means intermediate each pair of consecutive ones of said output ports for delaying appearances of said signal therebetween by a predetermined time interval equal to said prescribed duration divided by the number of said output ports, means comprising a plurality of storage elements each of which is connected to an individual one of said output ports and being actuated by said clock signals for storing samples of states of said output ports, decoding means responsive to prescribed sequences of said samples and signifying a signal sample on one of said output ports synchronized with a said clock signal with said clock signal centered in occurrence proximate to a midpoint in the duration of said signal sample, means operated by said decoding means for selecting one of said storage elements monitoring said one of said output ports, and means enabled by said selecting means for steering succeeding samples from said one of said storage elements to said shift register.

11. The invention of claim 10 wherein said generating means further comprises a delay line including a plurality of serially-connected delay elements individual ones of which are connected intermediate consecutive ones of said output ports and being effective for providing a time delay equal to said predetermined interval of said signal therebetween.

12. The invention of claim 11 wherein said storage elements further comprise a plurality of first flip-flops each of which is connected to an individual one of said output ports and operable under control of said clock signals for storing said samples of said states of said output ports, a plurality of second flip-flops, and a plurality of gates connecting individual ones of said first flip-flops to individual ones of said second flip-flops for transferring stored samples from said first flip-flops for storage in said second flip-flops.

13. The invention of claim 12 wherein said decoding means comprises a plurality of decoding gates having connections to ones of said first and second flip-flops, individual ones of said decoding gates being effective for detecting individual ones of said prescribed sequences of said samples, and wherein said selecting means comprises a plurality of selection flip-flops individual ones of which are operated by individual ones of said decoding gates in response to a detection of predetermined ones of said prescribed sequences.

14. The invention of claim 13 wherein said selecting means further comprises a plurality of holding gates connecting individual ones of said decoding gates to individual ones of said selection flip-flops, and wherein each of said holding gates has a connection from an output of one of said selection flip-flops for maintaining an operated state of said one of said selection flip-flops.

15. The invention of claim 14 wherein said steering means comprises a plurality of steering gates each of which is connected to individual ones of said selection flip-flops and being operable under control of said last-mentioned flip-flops and clock signals for steering samples from selectable ones of said second flip-flops to said register.

* * * * *

UNITED STATES PATENT AND TRADEMARK OFFICE

CERTIFICATE OF CORRECTION

PATENT NO. : 3,908,084

DATED : September 23, 1975

INVENTOR(S) : Paul R. Wiley

It is certified that error appears in the above-identified patent and that said Letters Patent are hereby corrected as shown below:

In the Specification, column 1, line 40, "ever" should read --even--. Column 7, line 56, "cntinually" should read --continually--. Column 8, line 15, after "20-1" insert --and--. Column 8, line 43, "30" should read --i+1--. Column 9, line 61, "in" should read --is--. Column 10, line 5, "form" should read --from--.

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*